US008924400B2

(12) United States Patent
Burson et al.

(10) Patent No.: US 8,924,400 B2
(45) Date of Patent: *Dec. 30, 2014

(54) METHOD AND SYSTEM FOR MAKING DYNAMIC GRAPHICAL WEB CONTENT SEARCHABLE

(71) Applicant: Disney Enterprises, Inc., Burbank, CA (US)

(72) Inventors: Robert Jeffrey Burson, Burbank, CA (US); Dexter Lee, Palos Verdes Estates, CA (US); Michael Scott Weksler, Tracy, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/030,650

(22) Filed: Sep. 18, 2013

(65) Prior Publication Data

US 2014/0026035 A1   Jan. 23, 2014

Related U.S. Application Data

(63) Continuation of application No. 11/897,757, filed on Aug. 31, 2007, now Pat. No. 8,572,102.

(51) Int. Cl.
*G06F 7/00* (2006.01)
*G06F 17/30* (2006.01)
*G06F 17/22* (2006.01)

(52) U.S. Cl.
CPC ...... *G06F 17/2247* (2013.01); *G06F 17/30864* (2013.01)

USPC .......................................... 707/756; 707/807

(58) Field of Classification Search
None
See application file for complete search history.

(56) References Cited

U.S. PATENT DOCUMENTS

| 7,584,194 | B2* | 9/2009 | Tuttle et al. .......................... 1/1 |
| 8,572,102 | B2* | 10/2013 | Burson et al. ................. 707/756 |
| 2007/0050338 | A1* | 3/2007 | Strohm et al. .................... 707/3 |
| 2007/0073650 | A1* | 3/2007 | Lueck ............................. 707/3 |
| 2007/0250212 | A1* | 10/2007 | Halloran et al. .............. 700/245 |
| 2007/0294230 | A1* | 12/2007 | Sinel et al. ...................... 707/3 |
| 2008/0141325 | A1* | 6/2008 | Ludvig et al. ................. 725/116 |
| 2008/0281793 | A1* | 11/2008 | Mathur ............................ 707/3 |
| 2014/0033086 | A1* | 1/2014 | Hebbar ......................... 715/764 |

\* cited by examiner

*Primary Examiner* — Cheryl Lewis
*Assistant Examiner* — Raheem Hoffler
(74) *Attorney, Agent, or Firm* — Farjami & Farjami LLP

(57) ABSTRACT

There is provided a method for making a rich web application searchable, one embodiment comprising providing companion content in a format searchable by a web search engine, loading the companion content in a web browser, calling a rich web application using the companion content, loading the rich web application in the web browser, and launching a data bridge interfacing the rich web application and the companion content. The method may further comprise retrieving a data feed for the rich web application, located in the companion content. In one embodiment, a system configured to make a rich web application searchable comprises a content storage, companion content in a format searchable by a web search engine, a data feed for the rich web application included in the companion content, and a data bridge interfacing the rich web application with the companion content.

14 Claims, 4 Drawing Sheets

METHOD AND SYSTEM FOR MAKING DYNAMIC GRAPHICAL WEB CONTENT SEARCHABLE

This application is a Continuation of U.S. patent application Ser. No. 11/897,757, filed Aug. 31, 2007.

BACKGROUND OF THE INVENTION

1. Field of the Invention

The present invention relates generally to accessing web content. More particularly, the present invention relates to searching web content.

2. Background Art

Packet networks, like the Internet for instance, have increasingly become a resource of choice for those seeking access to information. Initially, the information being provided over these networks typically took the form of relatively static data, and the formatting languages developed to facilitate information exchange were optimized for presentation of such data. One of these languages, Hypertext Markup Language (HTML), was used extensively in the design of early web pages. Partly as a result of its pervasiveness as a format in early web design, search engines developed to assist network users in retrieving desired content were designed to optimize retrieval of HTML data, and most retain that emphasis today.

As the user base of packet networks has broadened to include sophisticated vendors and consumers, however, greater importance has been placed on those networks as sources of advertising and entertainment. Savvy and increasingly demanding consumers desire to access frequently updated information, and have increasingly lofty expectations of the richness of packet network provided entertainment. Advertisers, seeking to meet these enhanced consumer expectations, have found the conventional HTML format too constraining. As a result, more and more web content is being developed using formats more enabling of the dynamic, rich media experience preferred by web users. Embedded graphics applications such as Flash and Silverlight, for example, have made it possible for advertisers to provide the dynamic graphical web content demanded by consumers.

Although advertisers have invested substantial resources in providing the type of rich media content desired by the consumers they seek to attract, those consumers may be unaware of the presence of that content, and be unable to search for it using one of the popular search engines. As mentioned, most search engines were designed to survey and index the traditional web infrastructure comprising HTML data. Consequently, those search engines may not recognize, or be able to retrieve, web content formatted to provide dynamic graphical content or other types of rich media applications. As a result, a web user entering a search query in a standard web search engine, has a high probability of retrieving largely static HTML data content, and a much lower likelihood of retrieving dynamic graphical web content from a Flash web page, for example. Thus, despite the efforts of advertisers and the preferences of consumers, limitations in conventional web search technologies render much of the dynamic graphical web content, as well as other rich media applications such as web plug-ins, largely invisible to those seeking them out.

One conventional approach to overcoming the problem of searching for dynamic graphical web content and other rich media applications is shown in FIG. 1, which requires the hosting of complementary web sites. FIG. 1 shows a diagram of a conventional communication system corresponding to a conventional web search. As shown in FIG. 1, communication system 100 includes client computer 102 communicating with web search engine 104 to perform a search for content available through packet network 106. A portion of the available content accessible through packet network 106 resides on content storage 110. Content storage 110 holds dynamic graphical web content 112, which when loaded by client computer 102, results in client computer 102 calling remote data feed 122, using data link 114. Content storage 110 also hosts companion content 116, which is formatted to be searchable by search engine 104.

In communication system 100 of FIG. 1, dynamic graphical web content 112 and remote data feed 122, which may correspond to a Flash web site and Flash feed, for example, are not searchable by web search engine 104. As a result, a search of packet network 106, using web search engine 104, for content corresponding to dynamic graphical web content 112, cannot retrieve dynamic graphical web content 112, or information contained in data feed 122, as indicated by broken communication links 118a and 118b. In order to make dynamic graphical web content 112 discoverable by client computer 102, the sponsor of that content must additionally provide companion content 116, which duplicates some of the information provided by dynamic graphical content 112 in a format searchable by search engine 104, for instance as an HTML web site. Companion content 116 may also provide a link (not shown in FIG. 1), allowing client computer 102 to navigate to dynamic graphical web content 112, for example.

The conventional solution represented by FIG. 1, while not making dynamic graphical web content 112 searchable by web search engine 104, does allow a user of client computer 102 to obtain information about dynamic graphical web content 112 from companion content 110, or to be redirected to the otherwise invisible content. This solution is significantly incomplete, however, because web search engine 104 remains unable to supply client computer 102 with information about dynamic components provided by remote data feed 122. In addition, the solution of FIG. 1 entails significant disadvantages flowing from the need to support a duplication of complementary web sites, which include the resource commitments required to maintain dual sites, as well as the problem of harmonizing of the sites, so that updates to one are appropriately reflected in the other.

In short, in many web searches performed today, a query entered into a search engine fails to retrieve dynamic graphical web content relevant to the search criteria, because that content is effectively invisible to commonly utilized web search engines, as described in relation to FIG. 1. As a result, those seeking to make dynamic graphical web content easier for web search engine users to locate, may resort to providing dual, complementary web sites. Today, in conventional systems, a first site comprises a format that enables presentation of dynamic graphical content, but is not searchable by most search engines; and, a second site is supported to complement the preferred site and comprise a non-preferred format selected because it is searchable by most search engines. However, this conventional solution imposes disadvantages associated with the need to maintain two sites concurrently, and the burden of harmonizing the content of those sites in order to avoid user confusion due to inconsistencies in the content of the different sites.

Accordingly, there is a need to overcome the drawbacks and deficiencies in the art by providing a more efficient, reliable and robust solution for making dynamic graphical web content and other rich web applications searchable by widely available web search engines.

SUMMARY OF THE INVENTION

A method and system for making a rich web application searchable, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
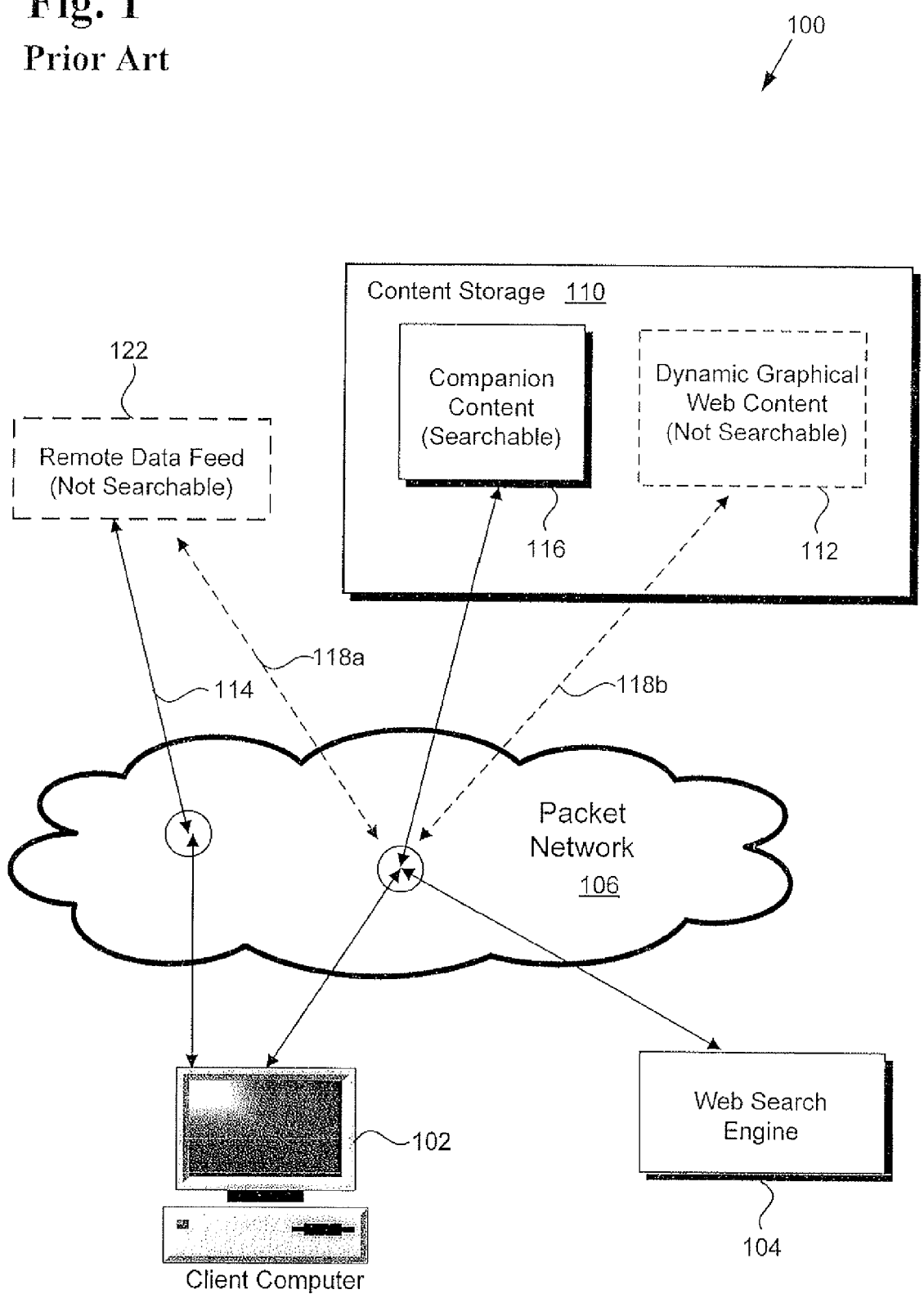
FIG. 1 shows a diagram of a conventional communication system corresponding to a conventional web search.

The present application is directed to a method and system for making a rich web application searchable. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals.

Figure 2:
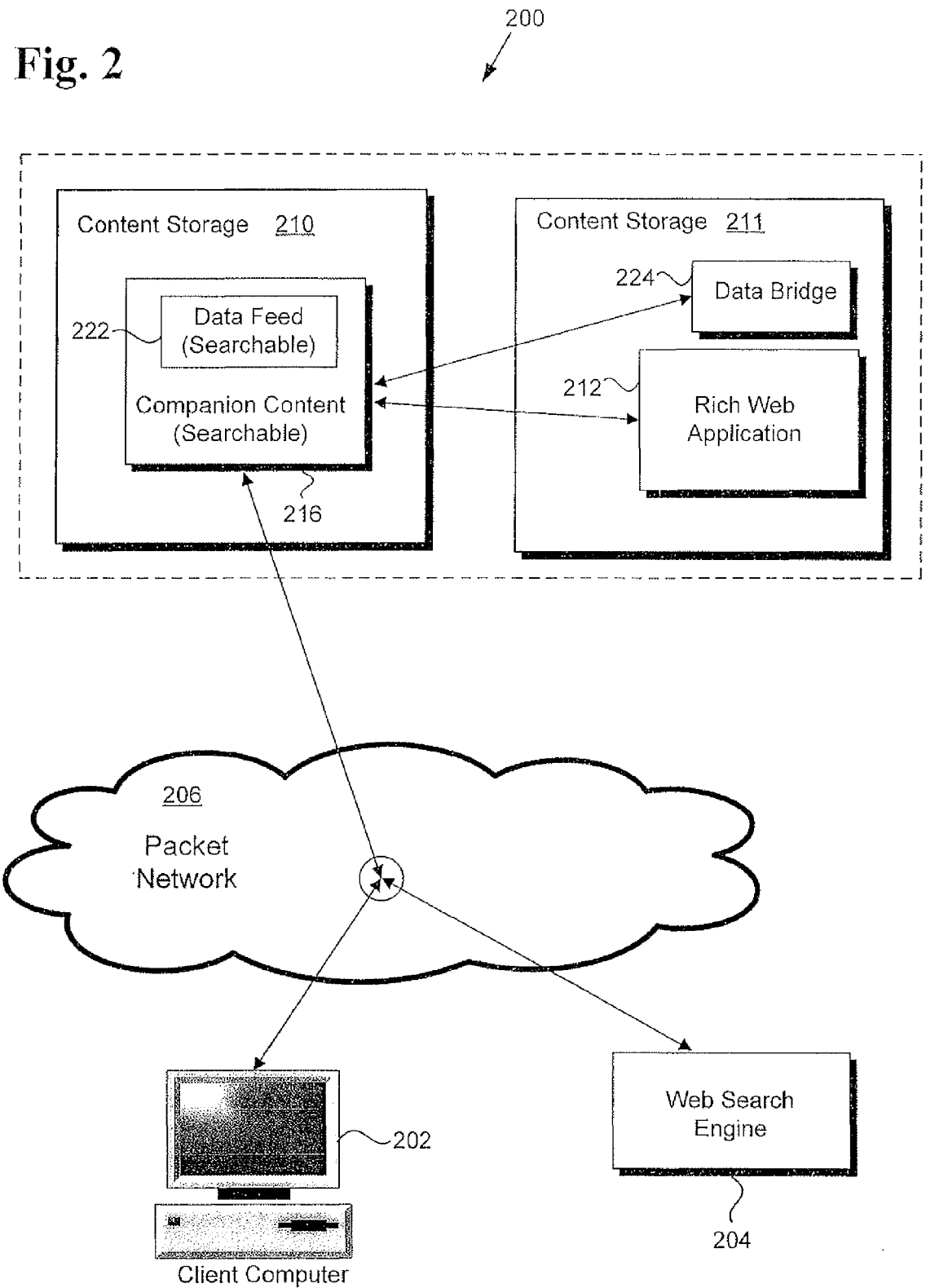
FIG. 2 shows a diagram of an exemplary communication system for making a rich web application searchable, according to one embodiment of the present invention.

FIG. 2 shows a diagram of communication system 200 for making a rich web application searchable, according to one embodiment of the present invention. In the embodiment of FIG. 2, system 200 comprises client computer 202, web search engine 204, packet network 206, content storage 210 holding companion content 216 including data feed 222, and content storage 211 holding rich web application 212 and data bridge 224. Companion content 216, data feed 222, rich web application 212, and data bridge 224 may be stored as data files on content storage 210 and 211, for example. It is noted that while in the present embodiment, data bridge 224 is shown as data separate from both companion content 216 and rich web application 212, in other embodiments data bridge 224 may be embedded in either companion content 216 or rich web application 212. It is further noted that although the files containing companion content 216, data feed 222, rich web application 212, and data bridge 224, respectively, may each be located on more than one content storage as shown in FIG. 2, in another embodiment, files containing companion content 216, data feed 222, rich web application 212, and data bridge 224 may all be held in a single content storage, such as either of content storage 210 or 211.

Content storage 210 and 211 may be accessed through packet network 206, as shown in the embodiment of FIG. 2. In another embodiment, however, content storage 210 and 211 may comprise a portable computer readable storage medium such as a compact disc read-only memory (CD-ROM), for example. The diagram of FIG. 2 corresponds to a web search, in which client computer 202 utilizes search engine 204 to seek content through a packet network, such as the Internet for example. Web search engine 204 in FIG. 2 may or may not include a web browser, and thus may or may not execute content located during a search of packet network 206.

FIG. 2 shows companion content 216 as including data feed 222 in a format searchable by search engine 204. System 200 also includes data bridge 224, that when run on client computer 202 provides an interface between rich web application 212 and companion content 216. Data bridge 224 is configured to retrieve data feed 222 and to deliver it to rich web application 212 in a format readable by rich web application 212. For example, rich web application 212 might comprise dynamic graphical web content, such as a Flash page, typically not searchable by web search engine 204, while companion content 216 may be a Hypertext Markup Language (HTML) page, which typically is searchable. In other embodiments, rich web application 212 may comprise another type of rich media application, such as a web plug-in, for example. Companion content 216 includes data feed 222, which may be written in Extensible Hypertext Markup Language (XHTML) format so as to be searchable by web search engine 204 as well. When loaded and run on client computer 202, data feed 222 is retrieved by data bridge 224, which may comprise a JavaScript program, for example, coded to deliver data feed 222 to rich web application 212 as Extensible Markup Language (XML) instructions or format.

Figure 3:
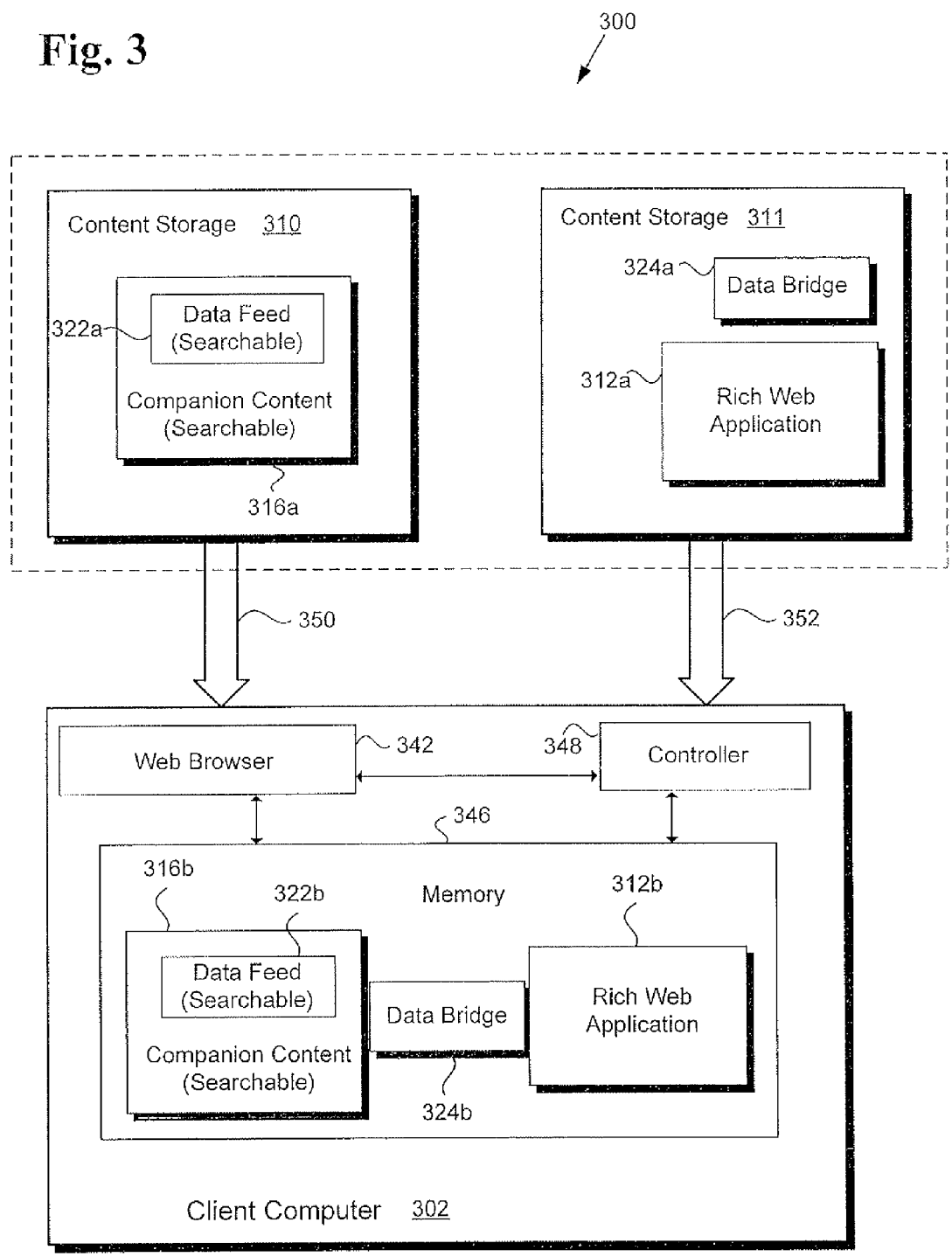
FIG. 3 shows exemplary content storage for use in the system shown in FIG. 2 in conjunction with a client computer.

FIG. 3 shows exemplary content storage 310 and 311 for use in the system shown in FIG. 2, in conjunction with a client computer. System 300 in FIG. 3 includes client computer 302 receiving data transfer 350 from content storage 310 and data transfer 352 from content storage 311. Client computer 302 corresponds to client computer 202, in FIG. 2. As shown in FIG. 3, client computer 302 comprises web browser 342, memory 346, and controller 348.

Content storage 310 and 311 correspond respectively to content storage 210 and 211 in system 200 of FIG. 2. As shown in FIG. 3, content storage 310 includes companion content 316a and data feed 322a, corresponding respectively to companion content 216 and data feed 222 in FIG. 2. Moreover, rich web application 312a and data bridge 324a located in content storage 311 of FIG. 3, correspond respectively to rich web application 212 and data bridge 224, in FIG. 2. As in FIG. 2, although the embodiment of FIG. 3 shows multiple content storage, in another embodiment, the files containing rich web application 312a, data bridge 324a, companion content 316a, and data feed 322a, may be contained in a single content storage, such as either content storage 310 or 311. In addition, although data bridge 324a is shown in FIG. 3 to comprise data separate from rich web application 312a and companion content 316a, in another embodiment, data bridge 324a may be included in rich web application 312a or companion content 316a.

Also shown in FIG. 3 are rich web application 312b, companion content 316b including data feed 322b, and data bridge 324b. In the present embodiment, rich web application 312b, companion content 316b including data feed 322b, and data bridge 324b are located in memory 346, having been received from content storage 310 and 311 via data transfers 350 and 352. In one embodiment, data transfers 350 and 352 correspond to download of companion content 316a including data feed 322a, rich web application 312a, and data bridge 324a over a packet network, for example. In another embodiment, the data transfer may correspond to retrieval of companion content 316a including data feed 322a, rich web application 312a, and data bridge 324a from a CD-ROM or other portable computer readable storage medium. Once transferred, the various content components, including rich web application 312b, companion content 316b, data feed 322b, and data bridge 324b are stored in memory 346 and run locally on client computer 302.

Controller 348 may be the central processing unit for client computer 302, for example, in which role controller 348 runs the client computer operating system, launches web browser 342, and facilitates presentation of rich web application 312b. Web browser 342, under the control of controller 348, may execute companion content 316b, data feed 322b, data bridge 324b, and 311b, to provide rich web application 311b to a user of client computer 302.

As shown in FIG. 3, when executed by web browser 342, data bridge 324b interfaces rich web application 312b with companion content 316b, and provides a data path for information contained in data feed 322b. In the present embodiment, the logical connection provided by data bridge 324b, when it is executed and run on client computer 302, enables placement of data feed 322a in companion content 316a, in a format searchable by a search engine. As a result, a query using keywords, for example, and directed at content such as dynamic graphical content 312a can result in that content being searchable by local computer 302. In response to a request to link to that content, content storage 310 and 311 may provide data transfer 350 and 352, which together comprise companion content 316a, data feed 322a, rich web application 312a, and data bridge 324a, which may then be stored in memory 346 and run locally on client computer 302.

Thus, by providing data feed 322a in a searchable format, rich web application 312a is made searchable by web search engines, such as web search engine 204, in FIG. 2. Moreover, by including data feed 322b for rich web application 312b in companion content 316b, and providing data bridge 324b, the present embodiment effectively consolidates the multiple content formats into an integrated logical unit. Consequently, in contrast to conventional solutions, the present embodiment offers a solution rendering a rich web application searchable, while coupling content so as to eliminate the need to maintain dual sites or contents. In so doing, the present embodiment further advantageously facilitates a harmonization between companion content 316b and rich web application 312b, and eliminates the need to update both companion content 316a and rich web application 312a every time a change is made to the content.

Figure 4:
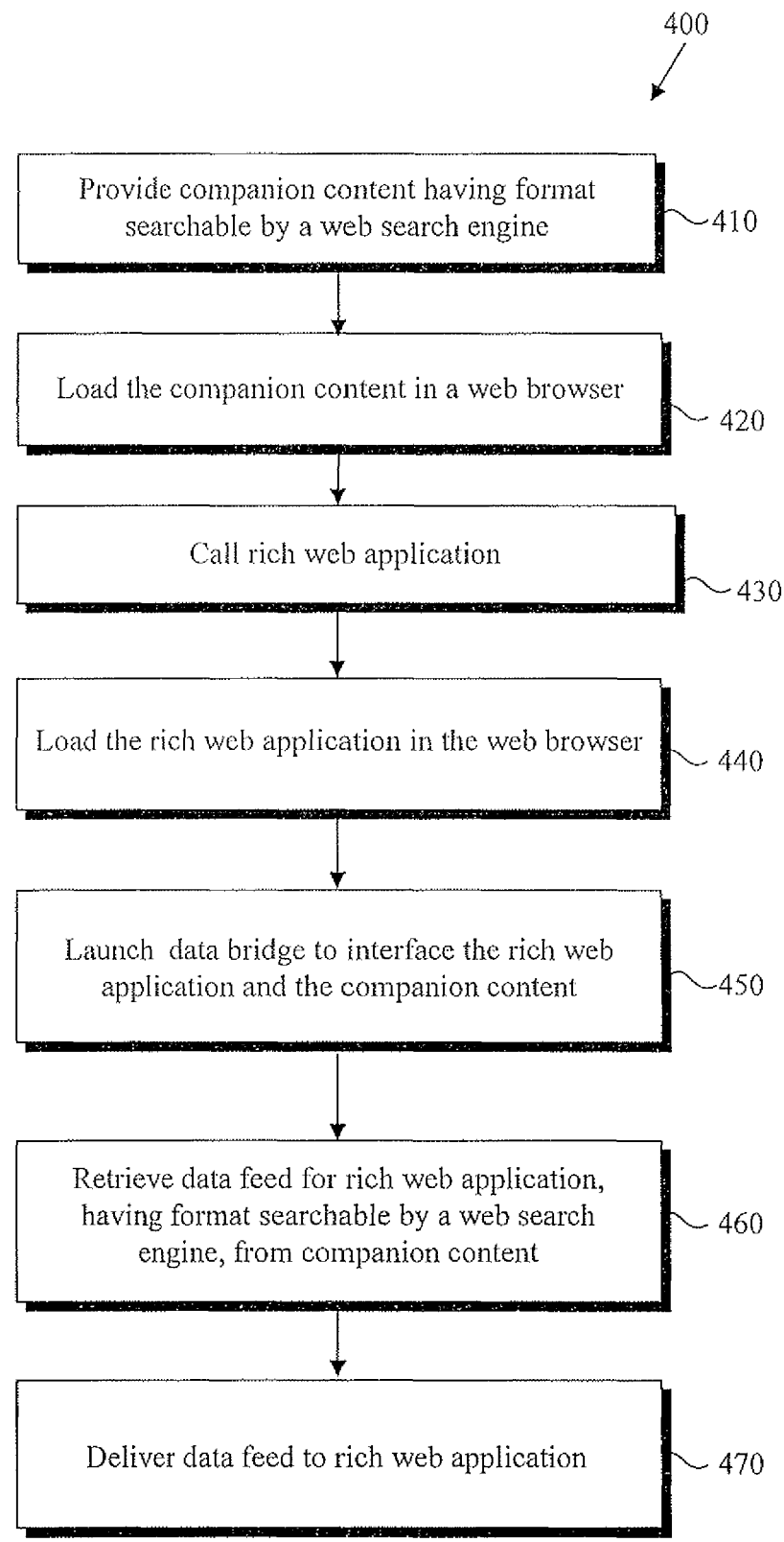
FIG. 4 is a flowchart presenting a method for making a rich web application searchable, according to one embodiment of the present invention.

The operation of system 300 is now described in conjunction with FIG. 4, which presents a method for making a rich web application searchable. Certain details and features have been left out of flowchart 400 that are apparent to a person of ordinary skill in the art. For example, a step may consist of one or more substeps or may involve specialized equipment or materials, as known in the art. While steps 410 through 470 indicated in flowchart 400 are sufficient to describe one embodiment of the present method, other embodiments may utilize steps different from those shown in flowchart 400, or may include more, or fewer steps.

Starting with step 410 in FIG. 4 and system 300 in FIG. 3, step 410 of flowchart 400 comprises providing companion content 316a having a format searchable by a web search engine, such as web search engine 204 in FIG. 2. As shown in FIG. 3, companion content 316a is located in content storage 310. As previously described, companion content 316a may comprise an HTML web page, for example.

The exemplary method of flowchart 400 continues with step 420, which comprises loading companion content 316a in web browser 342, whereupon the companion content is executed as companion content 316b. Step 420 might be performed in the process of a web search conducted by client computer 302, seeking data corresponding to rich web application 312a.

Flowchart 400 continues with step 430, in which rich web application 312a is called. Rich web application 312a may comprise a Flash page, as previously described, and may be called in response to HTML instructions encoded in companion content 316a, for example. As a result, rich web application 312a is loaded in web browser 342 and run as rich web application 312b in following step 440.

In step 450, data bridge 324b is launched, and serves to interface rich web application 312b and companion content 316b. Data bridge 324b is then utilized by rich web application 312b, to retrieve data feed 322b from companion content 316b in step 460 of flowchart 400. Data bridge 3241) may comprise a JavaScript program, for example, coded so as to retrieve data feed 322b from companion content 316b, and deliver data feed 322b to rich web application 312b in subsequent step 470.

A further advantage of the present method over conventional solutions, is that inclusion of data feed 322a in companion content 316a and their common delivery to client computer 302, obviates the requirement of a separate data band call to a remote data feed, corresponding to data link 114, in FIG. 1. Instead, the present method utilizes data bridge 324b to retrieve data feed 322b directly from companion content 316b, which in the embodiment of FIG. 3 is delivered to client computer 302 through data transfer from content storage 310 and 311, As a result, data feed 322b is effectively co-located with rich web application 312b, in memory 346. Consequently, network traffic can be reduced through use of the exemplary method presented in FIG. 4. In addition, once data bridge 324a is transferred to memory 346 of client computer 302, it becomes a local asset, and need not be re-acquired each time client computer 302 seeks to access a rich web application. Instead, when a rich web application is sought, web browser 342 can simply verify the presence of data bridge 324b and request transfer of the desired rich web application.

Thus, in one embodiment of the present invention, a solution is offered to the problem of making a rich web application searchable by commonly used web search engines, while avoiding the drawbacks associated with conventional solutions. For example, by advantageously providing a data bridge to interface a rich web application not directly searchable by web search engines, with companion content searchable by those tools, such embodiment makes it possible to effectively co-locate that diverse content, eliminating the need to support more than one web site. By further providing a data feed for the rich web application in a format searchable by web search engines, such embodiment renders that dynamic graphical content searchable. Locating the data feed within the companion content offers the additional advantage of reducing network traffic.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A computer comprising:
   a memory storing:
      a companion content for presenting a markup language (ML) web page format;
      a data feed including ML data searchable by a web search engine;
      a web application for presenting a dynamic graphical web page format; and
      a data bridge for providing the data feed to the web application;
   a processor configured to:
      load the companion content into a web browser for presenting the ML data of the data feed in the ML web page format;
      call the web application, the call being performed by an instruction in the companion content executed in response to the companion content being loaded;
      load the web application into the web browser for presenting the ML data of the data feed in the dynamic graphical web page format; and
      launch the data bridge for feeding the ML data of the data feed to the web application, the data bridge being an embedded asset in one of the web application and the companion content.

2. The computer of claim 1, wherein the data feed is included in the companion content.

3. The computer of claim 1, wherein the data feed comprises Extensible Hypertext Markup Language (XHTML) data.

4. The computer of claim 1, wherein the data feed comprises Extensible Markup Language (XML) data when the data feed is delivered to the web application.

5. The computer of claim 1, wherein the web application comprises an embedded graphics application.

6. The computer of claim 1, wherein the web application comprises a Flash movie.

7. The computer of claim 1, wherein the data bridge comprises a JavaScript program.

8. A method for use by a computer having a memory and a processor, the memory storing a companion content for presenting a markup language (ML) web page format, a data feed including ML data searchable by a web search engine, a web application for presenting a dynamic graphical web page format, and a data bridge for providing the data feed to the web application, the method comprising:
   loading, using the processor, the companion content into a web browser for presenting the ML data of the data feed in the ML web page format;
   calling, using the processor, the web application, the calling being performed by an instruction in the companion content executed in response to the companion content being loaded;
   loading, using the processor, the web application into the web browser for presenting the ML data of the data feed in the dynamic graphical web page format; and
   launching, using the processor, the data bridge for feeding the ML data of the data feed to the web application, the data bridge being an embedded asset in one of the web application and the companion content.

9. The method of claim 8, wherein the data feed is included in the companion content.

10. The method of claim 8, wherein the data feed comprises Extensible Hypertext Markup Language (XHTML) data.

11. The method of claim 8, wherein the data feed comprises Extensible Markup Language (XML) data when the data feed is delivered to the web application.

12. The method of claim 8, wherein the web application comprises an embedded graphics application.

13. The method of claim 8, wherein the web application comprises a Flash movie.

14. The method of claim 8, wherein the data bridge comprises a JavaScript program.

* * * * *